June 27, 1944.  L. LOEWY ET AL  2,352,442
STRAIGHTENING MACHINE FOR METAL BARS
Filed May 21, 1941    2 Sheets-Sheet 1
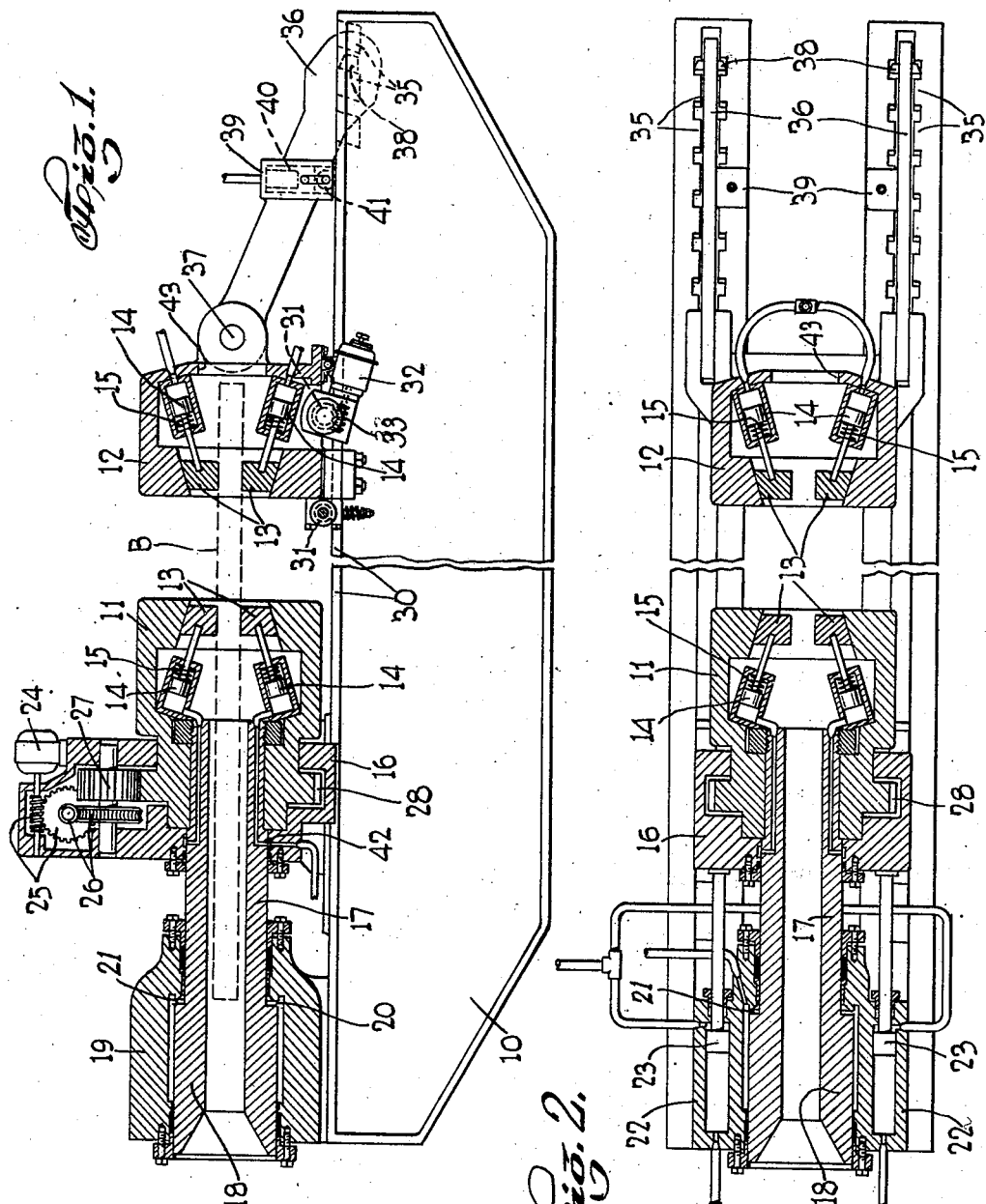
INVENTORS
LUDWIG LOEWY
FRANK SIDNEY SALTER
BY
ATTORNEYS

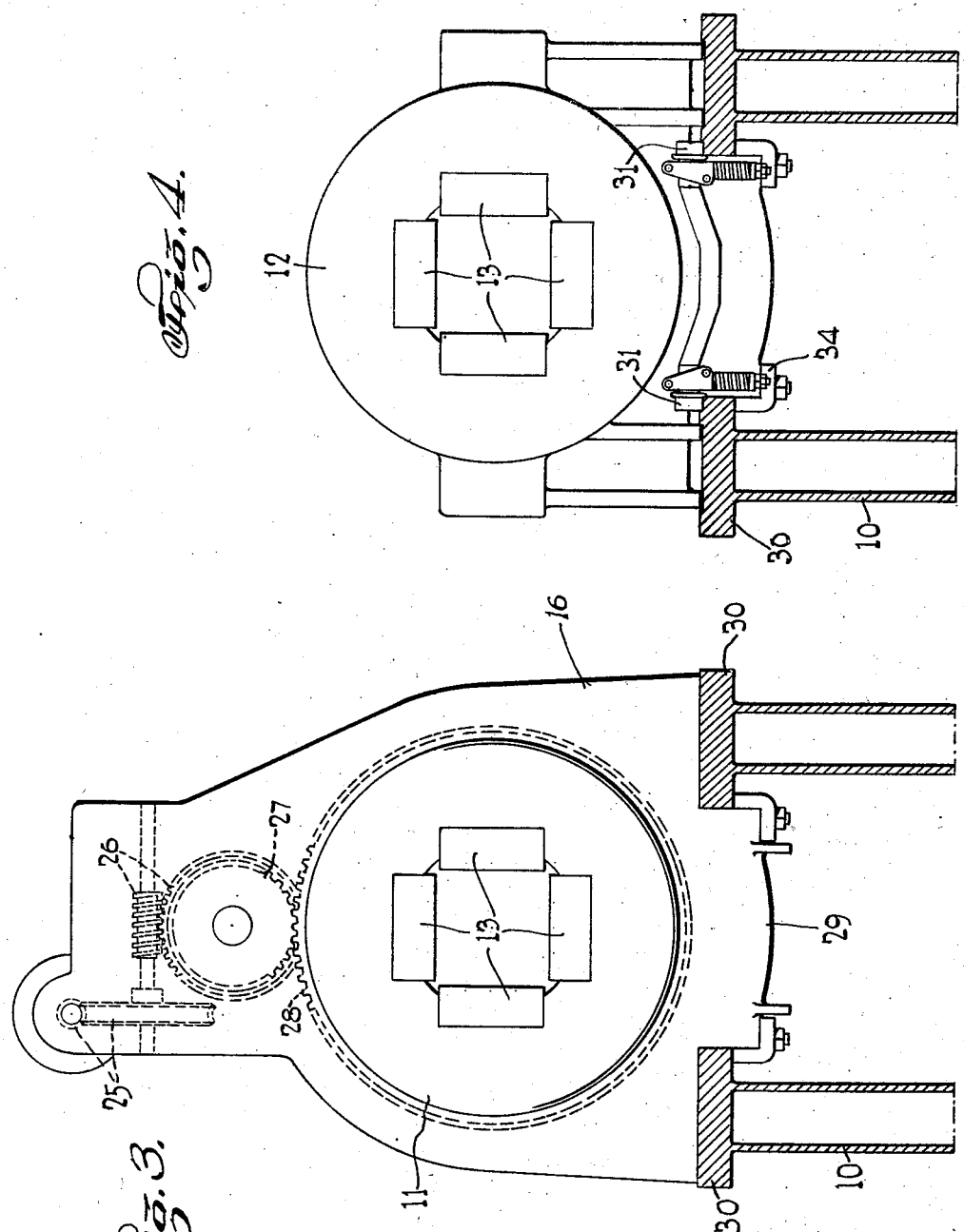

Patented June 27, 1944

2,352,442

UNITED STATES PATENT OFFICE 2,352,442

STRAIGHTENING MACHINE FOR METAL BARS

Ludwig Loewy, Bournemouth, and Frank Sidney Salter, Parkstone, England, assignors to The Loewy Engineering Company, Limited, London, England, a corporation of Great Britain Application May 21, 1941, Serial No. 394,538
In Great Britain May 23, 1940

8 Claims. (Cl. 153—2)

This invention relates to a straightening machine for metal bars and, in particular, profiled or flanged bars of non-ferrous metals, such as aluminium, magnesium and their alloys, which are manufactured in extrusion presses.

Recent developments in this field of extrusion have made it possible to produce large bars of intricate sectional contour and of large size. The bars leave the extrusion presses while still hot, and it frequently occurs that they become deformed through uneven cooling or for other reasons, and are buckled or twisted either locally or throughout their entire length.

It has, therefore, become necessary to subject the bars to straightening and untwisting operations, with a view to bringing them into correct rectilineal condition.

The machines used hitherto for this purpose comprise a bed or frame on which two gripping heads are mounted, each containing a set of holders for jaws are adapted to clamp the bar. Means are provided, preferably in the nature of a hydraulic power drive associated with one of the gripping heads, to move the latter away from the other with a bar placed in position. The bar can thus be subjected to a tension beyond the yielding point of its material, with the result that it is stretched out and all buckles and kinks are removed from it. One of the gripping heads is further adapted to be displaced along the frame bed, so as to allow the distance between the gripping heads to be adjusted according to the different lengths of bars, means being further provided for clamping the moveable gripping head to the frame during the stretching operation, so that it can take up the reaction of the tensional force applied to the bar.

It has been proposed in a machine of the kind described above to make one of the gripping heads rotatable by means of a separate power drive while a bar is clamped by the jaws of this head. By turning one head with a bar clamped therein, twists could be removed, but only if they occurred at that end of the bar which was clamped to the head provided with the turning means. It was, however, impossible to eliminate the twists which occurred between the ends of the bar. Further, it has not been possible in this known machine to twist the bar at the same time as the stretching power is applied, because no thrust bearing was provided for the rotating head which was capable of sustaining the required load.

A straightening machine for bars has already been proposed wherein a carriage was provided between the two gripping heads, this carriage having a die with an aperture corresponding to the correct shape of the sections of the bar under treatment, and being further adapted to be traversed longitudinally along the said bar. The object of this arrangement was to correct the relative angular position of any flanges and webs of the bar. This apparatus did not, however, permit the removal of local twists from the bar between its ends.

The object of the present invention is to provide a straightening machine for metal bars which allows the removal of local twists in a manner which is simple, efficient and thorough at the same time. This object is attained by providing an unrestricted passage for the bars through which they can be moved through the machine in the direction of its axis, so that a bar can be made to take up any desired position with regard to the untwisting apparatus provided in the machine. Thus, this apparatus can be brought into operation on any part of the bar, so that local twists which occur between the ends of the bar can be easily and speedily corrected.

This invention also provides for subjecting the bar to torsion at the same time as a longitudinal pull is applied, so that both operations may work together in removing deformations from the bar.

The passage through which the bars can be moved is obtained by making all parts of the machine which are arranged in its axis hollow, whether they belong to the hydraulic power drive or to the gripping mechanism.

In a preferred embodiment of the machine according to the invention, the ram of the hydraulic power drive is hollow and an annular pressure chamber formed around the ram, the ram having a shoulder which acts as a piston in the pressure chamber when the ram is being axially moved.

Means are arranged on both sides of the hydraulic main drive for returning the gripping head attached to the ram to its starting position. The hollow ram is also capable of rotating within the pressure chamber and, during this torsional movement, the pressure fluid supports the stretching load, in the manner exemplified by a fluid-supported thrust bearing as commonly employed in other machinery.

For purposes of untwisting, the gripping head attached to the hollow ram is rotatably mounted on a carrier and associated with an independent drive by means of which the gripping head can be turned while the bar is clamped therein.

Bars are charged into the machine according to the invention by passing them through the hollow ram and gripping heads so that that part of the bar which is twisted is within the reach of the untwisting apparatus, whereupon the two sets of jaws are operated to clamp the bar. The bar is then subjected to a stretching and untwisting operation. In case the bar has more than one twist between its ends, the latter is moved stepwise through the machine, thereby subjecting one twisted part after another to the action of the untwisting apparatus.

The machine according to the invention has the further advantage that the stretching operation need not necessarily be applied over the whole length of the bar as was the case with the former type of machine, but that it can be applied selectively to individual parts of the bar with a consequent increase in efficiency and a saving of power.

A further advantage is that the bars may be passed into the machine at one end, straightened, and discharged at the other end, thus always following one another in the same longitudinal direction, giving convenience in handling.

In order to make the invention more clearly understood, one embodiment will be described by way of an example with reference to the accompanying drawings in which:

Fig. 1 is a sectional elevation for a straightening machine according to the invention, partly in section.

Fig. 2 is a sectional plan view of the machine.

Figs. 3 and 4 are both sectional views of the same, looking towards opposite ends.

Arranged upon frame 10 are the two gripping heads 11 and 12 of the machine, each head being equipped with a set of jaw-holders 13. The jaw holders are adapted to serve as sockets for interchangeable jaws (not shown in the drawings) which are shaped in accordance with the contour of the bar under treatment, and are slidably supported on inclined surfaces of the gripping heads by means of hydraulic rams 14.

The inclination of the supporting surfaces is such that by moving rams 14, the jaw-holders 13 approach each other, whereby a bar B is clamped fast between the jaws. As soon as the rams 14 are relieved of pressure fluid, they return, with the jaw-holders 13, into the inoperative position under the action of pull-back springs 15.

Gripping head 11 is supported on frame 10 by means of a carrier 16 and is attached to an extension 17 of a hollow ram 18. This ram, together with a cylinder 19, forms the main hydraulic drive of the straightening machine by which tension is applied to the bar B beyond its yield point. Pressure chamber 20 of the main hydraulic drive is arranged around the ram 18 which has at its rearward end an increased outward diameter to form there a shoulder 21, to act as a piston in the pressure chamber when the ram is axially moved.

As seen in Fig. 1, ram 18 and extension 17 protrude both beyond cylinder 19 and are supported and guided at the opposite open ends of the cylinder. Arranged at both sides of cylinder 19 are return cylinders 22 with fluid-operated rams 23 which are associated with the carrier 16 for shifting the gripping head back into its initial position.

Carrier 16 also serves as a casing for a rotary power drive for gripping head 11, so as to make it possible to turn this gripping head about the longitudinal axis of the machine with a bar held in position, for the purpose of removing local twists from the bar. This rotary drive includes an electric motor 24, two sets of worm gears 25 and 26, a pinion 27 and a spur wheel 28 mounted on or integral with gripping head 11 (Fig. 3).

As will be seen from Fig. 3, the carrier 16 has a depending tongue 29 which engages guide-plates 30 on frame 10 from below, so that the carrier 16 is locked against rotary movement. It will, however, be apparent that ram extension 17 and also ram 18 will partake in the rotary movement of gripping head 11. The stretching load exerted on the ram will then be supported by the pressure fluid in chamber 20 so that any other bearing for taking up the axial thrust can be dispensed with, the only friction which the ram and the ram extension have to overcome on their rotation being that at the packings.

Gripping head 12 is supported directly on the guide-plates 30 of frame 10 by means of two sets of rollers 31, one set of which is driven by means of an electric motor 32 through the intermediary of a worm gear 33. In this way, the gripping head 12 can be moved along frame 10 and can take up any desired position along the guideways 30. Tongues 34 are provided at the base of gripping head 12 which engage the guideways 30 from below and serve to lock the gripping head 12 against any rotary movement, in the same way as the tongue 29 acts with regard to carrier 16 (Fig. 4).

Means are provided for anchoring gripping head 12 along the frame 10, these means comprising a series of teeth 35 provided at both sides of the frame, and a pair of levers 36 pivoted at 37 to gripping head 12 and provided with lugs 38 which can be dropped into the gaps between the teeth 35. In order to release the gripping head 12, fluid-operated cylinders 39 are arranged on levers 36 which co-operate with rams 40 mounted on independent rollers 41.

Throughout the drawings, the inlet and outlet piping for the fluid-operated rams 14, 18 and 40 are only diagrammatically indicated, and their control valves are omitted altogether since the fluid pressure system does not form part of the present invention. It is, however, to be understood that an annular distribution chamber 42 is provided with the carrier 16 for the purpose of enabling pressure fluid to be supplied to the rams 14 of gripping head 11, irrespective of the angular position of gripping head 11.

As will be seen from the drawings, and particularly from Figs. 1 and 2, the gripping heads 11 and 12 have both straight-through passages in the direction of the axis of the machine. The central part of the gripping heads 11 and 12 is made hollow, and that of gripping head 11 terminates in the hollow ram extension 17, whereas the rear wall of gripping head 12 has a central aperture 43. The area of these passages, as well as that of the bore in parts 17 and 18, is sufficiently large to accommodate bars of any cross section which the machine is capable of handling. By these means it is possible to move the bars freely from one end of the machine to the other, passing them through the main hydraulic drive as well as through both gripping heads. This permits the bars to be charged at one end of the machine and to be removed at the other end; and allows the bars to go through this machine in one continuous flow and always in the same direction. This facilitates the operation of the machine, shortens the time necessary for handling the bars, and makes the machine particularly suitable for modern mass production plant.

Other important features result from the fact that with the afore-described arrangement of passages in the gripping heads and in the main hydraulic drive, either of the gripping heads can be freely displaced over the entire length of the frame with a bar held in position by the other gripping head and, further, that the distance between the two gripping heads is freely adjustable. This enables the point of engagement of the bar with the gripping heads to be selected at will and gives the two further advantages that (a) any part of the bar can be submitted to the direct action of the untwisting apparatus embodied in gripping head 11 and (b) the straightening effort can be selectively applied to individual parts of the bar only, and need not be applied all over its length. Twists can, therefore, be removed from the bar wherever they occur, whether at the ends of the bar or at intermediate parts, and, by applying the straightening effort to a part of the bar only, a saving in power and an increase in efficiency is achieved.

Finally, the machine according to the invention allows the rotary power to be applied at the same time as the straightening power, which was not possible with known machines, and gives the advantage that the time required for treatment of each individual bar on the machine can be considerably reduced.

We claim:

1. In apparatus for straightening bars, in combination, a bed, a headstock mounted on said bed, a hollow plunger movable within said headstock, a chuck carried by said plunger having bar-gripping jaws, said jaws forming an opening in line with the hollow plunger and movable inwardly to grip a bar extending through said plunger, a tailstock mounted on said bed and movable toward and from the headstock, a second chuck carried by said tailstock and having bar-gripping jaws movable inward to grip the bar, means to anchor the tailstock on said bed, and means for rotating one chuck relative to the other chuck to twist the bar and means for actuating the hollow plunger to move it away from said tailstock to draw the bar, said means for actuating the hollow plunger constituting a cylinder and a fluid pressure chamber surrounding said plunger and concentric therewith, the hollow plunger, the headstock and tailstock, and both chucks being open centrally therethrough to permit a bar to pass longitudinally therethrough.

2. In apparatus for straightening bars, in combination, a bed, a headstock having an axial opening for passage of a bar, mounted on said bed, a hollow stepped plunger movable axially and rotatably in said headstock, a chuck having an axial opening in alignment with said hollow plunger and carried by said plunger and having bar-gripping jaws movable diagonally inward to grip a bar extending through said plunger, a carriage having an opening in axial alignment with said hollow plunger for passage of a bar mounted on said bed and adjustable toward and from said headstock, means to anchor the carriage on said bed, a second chuck having an axial opening for passage of a bar carried by said carriage and having means to grip a bar, and means for applying fluid pressure behind the step of said plunger to actuate the same to move the chucks apart for drawing a bar mounted in and extending axially through said chucks and means for rotating the first mentioned chuck to twist the bar.

3. In a machine for straightening bars of the type described, a frame, two gripping heads mounted on said frame, each gripping head having an opening therethrough in axial alignment with the opening in the other gripping head through which bars may be passed from end to end of the machine, means in gripping heads to grip bars at spaced points along the bars, means to move one of said gripping heads and to anchor said gripping head on said frame at spaced distances from the other gripping head, and power means concentric with the opening through the other gripping head directly attached thereto and having an opening therethrough, through which bars may pass, to move said gripping head longitudinally relative to the anchored gripping head, and means to rotate one of said gripping heads while the gripping heads are being moved longitudinally relative to each other.

4. In a machine for straightening bars of the type described, a frame, two gripping heads movably mounted on said frame, each gripping head having an opening therethrough in axial alignment with the opening in the other gripping head through which bars may be passed from end to end of the machine, means in said gripping heads to grip bars at spaced points along the bars, means to anchor one of said gripping heads on said frame at spaced distances from the other gripping head, power means concentric with the opening through the other gripping head and having an opening therethrough, through which bars may pass, to move said gripping head longitudinally relative to the anchored gripping head, said power means being rotatable, and power means to rotate one of said gripping heads relative to the other gripping head.

5. In a machine for straightening bars of the type described, a frame, two gripping heads movably mounted on said frame, each gripping head having an opening therethrough in axial alignment with the opening in the other gripping head through which bars may be passed from end to end of the machine, means in said gripping heads to grip bars at spaced points along the bars, means to anchor one of said gripping heads on said frame at spaced distances from the other gripping head, hollow power means concentric with the opening through the other gripping head to move said gripping head longitudinally relative to the anchored gripping head, said hollow power means being rotatable relative to the anchored gripping head, and means to rotate said other gripping head and said hollow power means.

6. In a machine for straightening bars of the type described, a frame, two gripping heads movably mounted on said frame and extending above said frame, each gripping head having an opening therethrough in axial alignment with the opening in the other gripping head through which bars may be passed from end to end of the machine, means in said gripping heads to grip bars at spaced points along the bars, means to anchor one of said gripping heads on said frame at spaced distances from the other gripping head, power means concentric with the opening through the other gripping head to move said gripping head longitudinally relative to the anchored gripping head, said power means constituting a stepped hollow piston surrounding the opening through said gripping head and a cylinder surrounding said piston whereby fluid pressure may be applied uniformly around said piston to move said gripping head away from the anchored gripping head, and means to rotate one of said gripping heads relative to the other gripping head.

7. In a machine for straightening bars of the type described, a frame, two gripping heads movably mounted on said frame and extending above said frame, each gripping head having an opening therethrough in axial alignment with the opening in the other gripping head through which bars may be passed from end to end of the machine, means in said gripping heads to grip bars at spaced points along the bars, means to anchor one of said gripping heads on said frame at spaced distances from the other gripping head, power means concentric with the opening through the other gripping head to move said gripping head longitudinally relative to the anchored gripping head, said power means constituting a stepped piston surrounding the opening through said gripping head and a cylinder surrounding said piston whereby fluid pressure may be applied uniformly around said piston to move said gripping head away from the anchored gripping head, and means to rotate said piston simultaneous with the application of fluid pressure thereto.

8. In a machine for straightening bars of the type described, a frame, two gripping heads movably mounted on said frame, each gripping head having an opening therethrough in axial alignment with the opening in the other gripping head through which bars may be passed from end to end of the machine, means in said gripping heads to grip bars at spaced points along the bars, means to anchor one of said gripping heads on said frame at spaced distances from the other gripping head, power means concentric with the opening through the other gripping head to move said gripping head longitudinally relative to the anchored gripping head, said power means constituting a stepped piston surrounding the opening through said gripping head and a cylinder surrounding said piston whereby fluid pressure may be applied uniformly around said piston to move said gripping head away from the anchored gripping head, and means to rotate said piston simultaneous with the application of fluid pressure thereto, the gripping means in said power actuated gripping head being controlled by a plurality of fluid pressure actuated grip control cylinders and pistons, fluid passages through said stepped piston leading to each of said grip control cylinders and a fluid chamber surrounding said piston and communicating with said passages at all times regardless of the longitudinal or rotational movement of said piston.

LUDWIG LOEWY.
F. S. SALTER.